United States Patent [19]

Yu et al.

[11] Patent Number: 4,746,003
[45] Date of Patent: May 24, 1988

[54] DIVERTING CONVEYOR

[75] Inventors: Thomas C. Yu, Cincinnati; Richard W. Kelsey, West Chester, both of Ohio

[73] Assignee: The Buschman Company, Cincinnati, Ohio

[21] Appl. No.: 905,430

[22] Filed: Sep. 10, 1986

[51] Int. Cl.$^4$ .............................................. B65G 47/46
[52] U.S. Cl. ..................................... 198/367; 198/372
[58] Field of Search ................................. 198/367, 372

[56] References Cited

U.S. PATENT DOCUMENTS

| | | | |
|---|---|---|---|
| 3,269,519 | 8/1966 | De Good et al. | 198/367 |
| 3,334,723 | 8/1967 | Reed et al. | 198/367 |
| 3,429,417 | 2/1969 | De Good et al. | 198/367 |
| 3,983,988 | 10/1976 | Maxted et al. | 198/367 |
| 4,328,889 | 5/1982 | Maxted | 198/367 |
| 4,509,636 | 4/1985 | Godbois | 198/372 |
| 4,598,815 | 7/1986 | Adama | 198/372 |

Primary Examiner—James A. Leppink
Assistant Examiner—Terry Lee Melius
Attorney, Agent, or Firm—Biebel, French & Nauman

[57] ABSTRACT

In a sortation conveyor for cartons and the like wherein selected cartons can be diverted out of the main line to a branch line by means of diverter wheels which are directed obliquely with respect to the main line and which pop up into the path of a carton traveling on the main line to divert it to an associated branch line, the diverter wheel assembly comprises a plurality of diverter wheels arranged in two rows extending transversely across the main conveyor line, with all of these wheels being skewed with respect to the main line so that they define a course directed toward their associated branch line, and also a single further diverter wheel which is located downstream from the two rows of wheels at a position overlapping but spaced from the adjacent side edge of the main conveyor belt or other main conveying means so that if a carton, particularly a large carton, extends beyond the two rows of diverter wheels, the extra diverter wheel will prevent such carton from making frictional contact with the main line conveying means and will at the same time propel it toward the branch line. Preferably this single diverter wheel is driven at a higher linear speed than the other diverter wheels so that it not only prevents a diverted carton from being pulled back onto the main conveyor line, but accelerates its movement to the associated branch line.

12 Claims, 4 Drawing Sheets

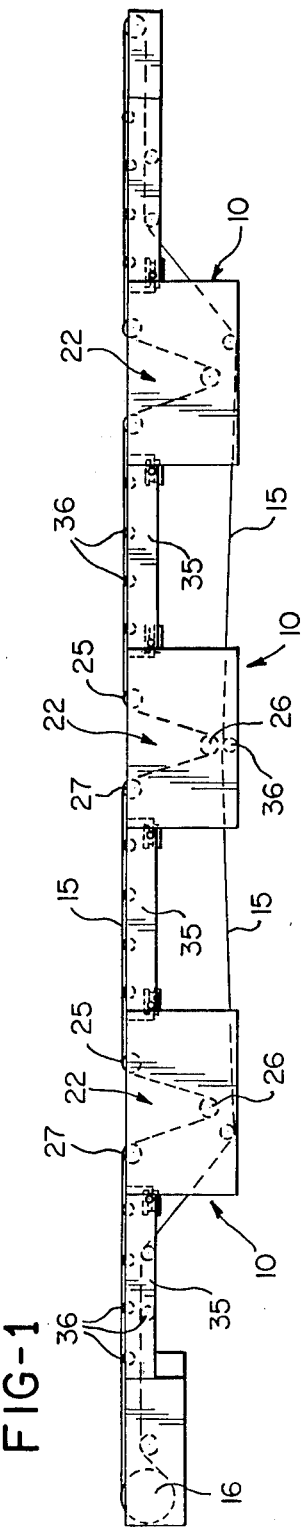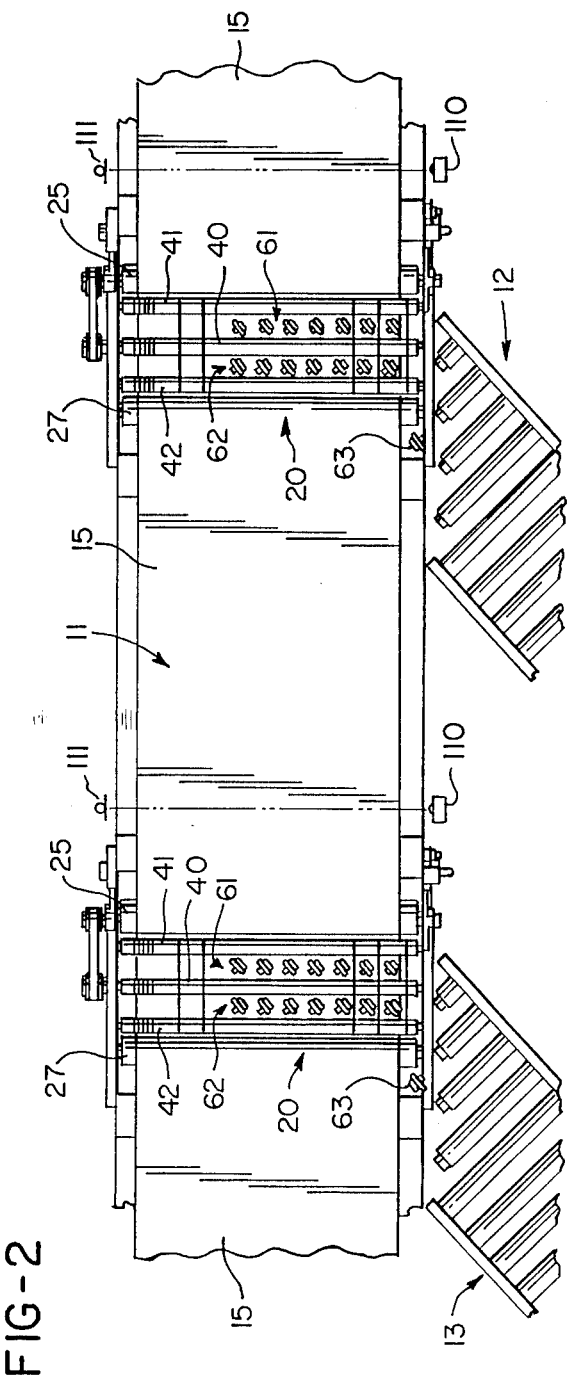
FIG-1
FIG-2

DIVERTING CONVEYOR

BACKGROUND OF THE INVENTION

This invention relates to package conveyors, and more particularly to sortation conveyors provided with branch lines to which selected cartons can be diverted out of the main line.

The present invention is specifically concerned with such conveyors wherein the diverting action is effected by means of diverter wheels which define a course directed obliquely with respect to the main line and which pop up into the path of a carton traveling on the main line to divert it to an associated branch line. Conveyors of this type, wherein the diverter wheels are positively driven, are shown, for example, in De Good U.S. Pat. No. 3,269,519 and Maxted U.S. Pat. Nos. 3,983,988 and 4,328,889.

SUMMARY OF THE INVENTION

The present invention provides a pop-up diverter wheel assembly in association with each branch line leading from the main conveyor line. In the preferred embodiment of the invention as described hereinafter, this diverter wheel assembly comprises a plurality of diverter wheels arranged in two rows which extend transversely across the main conveyor line, with all of these wheels being canted or skewed at the same angle to the main line so that they define a course directed toward their associated branch line. In addition, the diverter wheel assembly includes a single further diverter wheel which is located downstream from the two rows of wheels at a position overlapping but spaced from the adjacent side edge of the main conveyor means, which may be a belt or a series of driven rollers.

In operation, whenever the diverter wheel assembly is activated, it is moved to its Up position wherein the two rows of wheels intercept and direct the next carton to the associated branch line. The additional, downstream roller provides an important supplementing and back-up action to the rows of wheels, in that if a carton, particularly a large carton, extends beyond the two rows of diverter wheels sufficiently to make frictional contact with the main line conveying means, the extra diverter wheel will prevent this from happening by raising the leading end of the carton and at the same time propelling it toward the branch line. This action is enhanced by driving the single diverter wheel at a higher linear speed than the other diverter wheels, so that the single wheel not only prevents a diverted carton from being pulled back onto the main conveyor line, but accelerates its movement to the associated branch line.

Details of the means by which the objectives and operating characteristics of the invention as summarized above are achieved will be more readily understood from the detailed description of the preferred embodiment of the invention which follows.

BRIEF DESCRIPTION OF THE DRAWINGS

FIG. 1 is a somewhat diagrammatic side view of the sortation conveyor in accordance with the present invention;

FIG. 2 is a schematic plan view illustrating the operation of a sortation conveyor shown in FIG. 1;

DESCRIPTION OF THE PREFERRED EMBODIMENT

Figure 3:
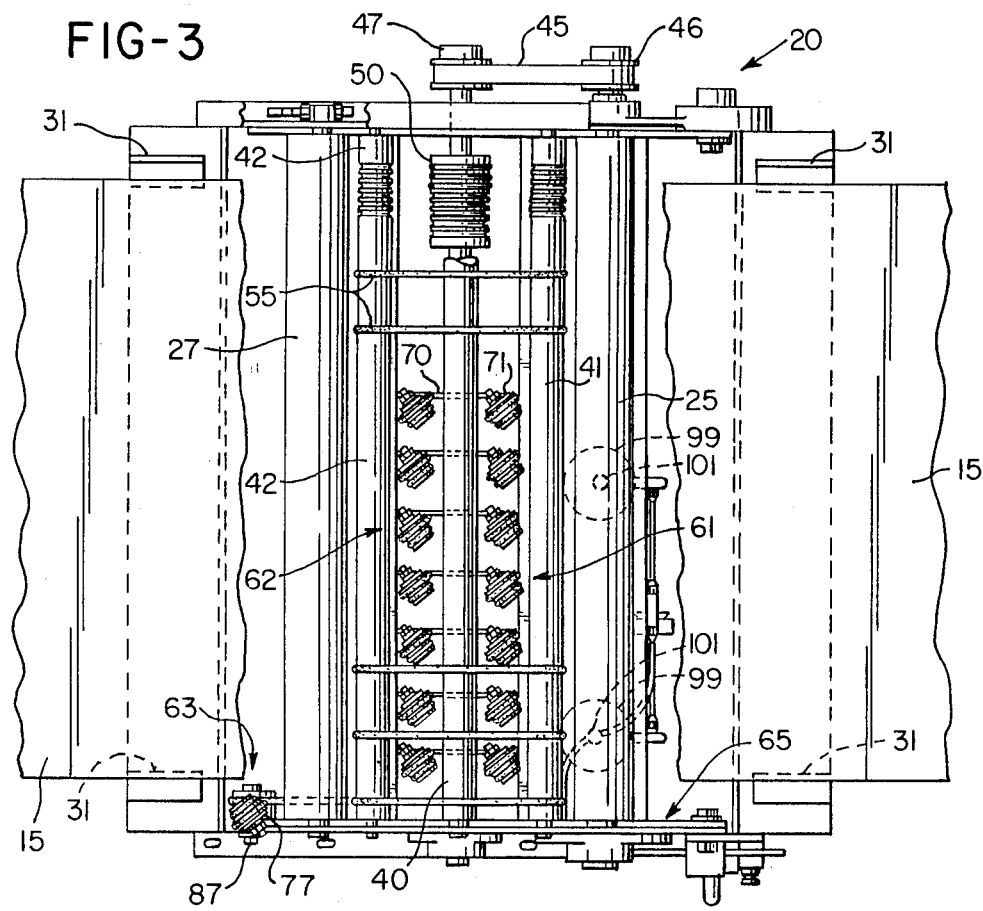
FIG. 3 is a plan view of one of the diverter sections of the conveyor shown in FIGS. 1 and 2.

FIGS. 1-2 illustrate somewhat diagrammatically a carton conveyor system including three diverter sections 10 for diverting cartons from the main conveyor line 10 to one of the branch lines 12 and 13 as the cartons move from right to left in these views. The main conveying means is a continuous belt 15 driven through a drive pulley 16 by a motor 17, although it could comprise an apron composed of chains and cross members, or a series of positively driven live rollers.

Each diverter assembly 20 includes guide rollers for the belt 15 which provide a gap 22 between adjacent sections of the top run of the belt wherein the diverter assembly of the invention operates. These guide rollers comprise a power take-off roller 25 at the upstream side of the gap 22, and two additional rollers 26 and 27, the roll 26 being mounted at a substantially lower level than rollers 25 and 27 to provide the gap 22 between rollers 25 and 27.

One of the diverter sections 20 is shown in enlarged detail in FIGS. 3-6. It includes a tub-like frame 30 having welded thereto at each end a pair of short angles 31 provided with slots 33 by which the frame 30 is adjustably connected to the adjacent frame sections 35 (FIG. 1) wherein are mounted a series of rollers 36 for supporting the top and return runs of the belt 15.

The rollers 25–27 are journalled in suitable bearings in the opposite side walls of the frame 30. In the gap 22 between rollers 25 and 27 are mounted three rollers 40, 41 and 42 which supplement the conveying action of the belt 15 for each carton that is to be carried beyond the particular diverter assembly. A fourth roller 44 is journalled in the sides of frame 30 below roller 40, and it is driven directly from the belt roller 25 by a belt or chain 45 running between pulleys or sprockets 46 and 47 mounted on extensions of the rollers 25 and 44 on the outside of the frame 30.

The roller 44 includes a grooved spool portion 50 near its end away from the branch line 12 from which O-ring belts 51 drive roller 40. Additional O-ring belts 52 provide a driving connection from spool 50 to a pair of rollers 53 and 54 journalled in the sides of the frame 30 at a lower level than roller 44 and forming parts of the power train to the diverter wheels as described hereinafter. Further O-ring belts 55 provide driving connections from the roller 40 to the rollers 41 and 42, and these belts 55 also define a discontinuous carton-supporting surface across the gap 22 for cartons to be conveyed further downstream.

The individual diverter wheels are identified as 60, and they are arranged in an upstream row 61, a downstream row 62, and a single unit 63 further downstream from the row 62 as well as from the gap 22 so that it is adjacent but spaced laterally from the edge of the belt 15 downstream from the belt roller 27. All of these diverter wheels 60 are carried by a diverter subframe 65 which is supported for pivoting movement in bearings 66 mounted on the sides of the frame 30.

Figure 7:
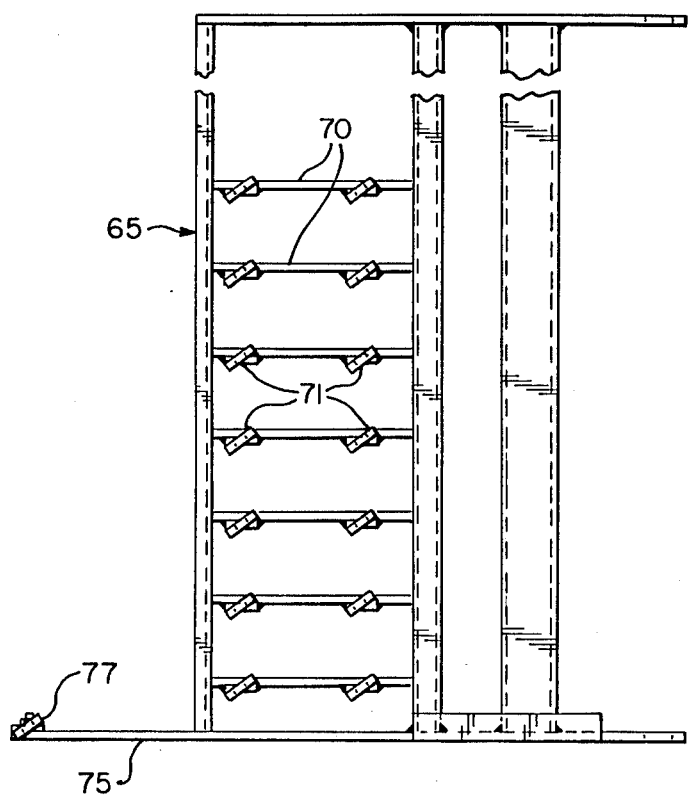
FIG. 7 is a plan view of the diverter assembly subframe which appears in FIGS. 3-6.
Figure 8:
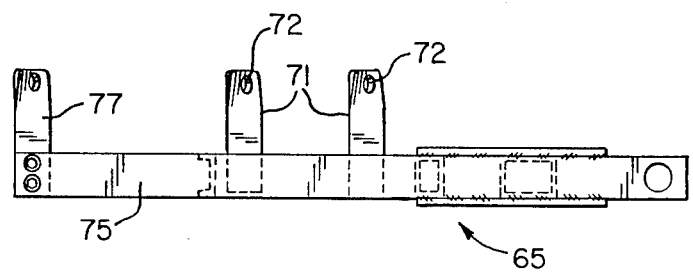
FIG. 8 is an elevational view taken as indicated by the line 8—8 of FIG. 7.

Referring to FIGS. 7-8, the diverter subframe 65 is generally rectangular in plan and includes a series of parallel bars 70 aligned with belt 15. The number of bars 70 increases with the width of the main conveyor, and each bar 70 has welded thereto a pair of vertical standards 71 each of which has a hole 72 therethrough which receives the axle bolt 73 on which one of the diverter wheels 60 is mounted. The upper end of each of these standards 71 is twisted about the same angle with respect to its lower end, preferred results having been obtained with an angle of approximately 37° between the upper end of each standard 71 and the bar 70 in which it is mounted.

The subframe 65 also includes a forwardly extending arm 75 on its end adjacent the branch line 12, at the end of which is a single further standard 77 that serves as the mounting for the single diverter wheel 63. As shown in FIGS. 3 and 7, this wheel 63 is spaced a substantial distance downstream from the second row 62 of diverter wheels, for example approximately 8.5 inches where the spacing between rows 61 and 62 is approximately 4.5 inches. The wheel 63 is also well beyond the downstream end of gap 22, but it will still lie within the projection of branch line 12. As shown in FIG. 3, the upstream side of branch line 12 is located just upstream of the first row 61 of diverter wheels, while the location of its opposite side depends on its width, which commonly varies in a range from 20 to 40 inches. The wheel assembly 63 will therefore define a course directed toward the associated branch line.

Figure 9:
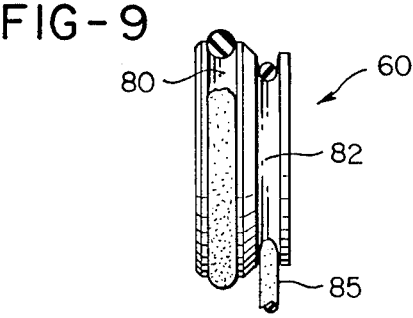
FIG. 9 is an enlarged view illustrating details of one of the diverter wheels shown in FIGS. 3-6.

Each of the diverter wheels 60 is of the same general configuration but with specific differences in dimension depending upon its position on the subframe 65. Referring to FIG. 9, each wheel 60 includes a groove 80, which receives an O-ring tire 81, and a second groove 82 for receiving the O-ring belt 85 by which that wheel is driven from the roller 53 or 54 in the case of the wheels in the rows 61 and 62. The single diverter wheel at position 63 is driven by a similar O-ring belt 85 through a grooved pulley 86 mounted by a pivot bolt 87 on the side wall of frame 30 and driven through an O-ring belt 88 by the roller 54.

The end of each wheel 60 wherein the groove 82 is formed has a different diameter depending upon whether the particular wheel is to be used in one of the rows 61 and 62 or the single position 63, in order to cause the wheels in each of these positions to be driven at a different linear speed from those in the other positions. More specifically, while all of the diverter wheels are driven at higher linear speeds than the belt 15, those in the rows 61 are driven at a lower speed than those in the row 62, while the single wheel at position 63 is driven at the highest linear speed. Accordingly, the grooves 82 in the diverter wheels in the row 61 have the largest dimension measured radially of the wheel, while the single wheel at the position 63 has the smallest such dimension.

Figure 4:
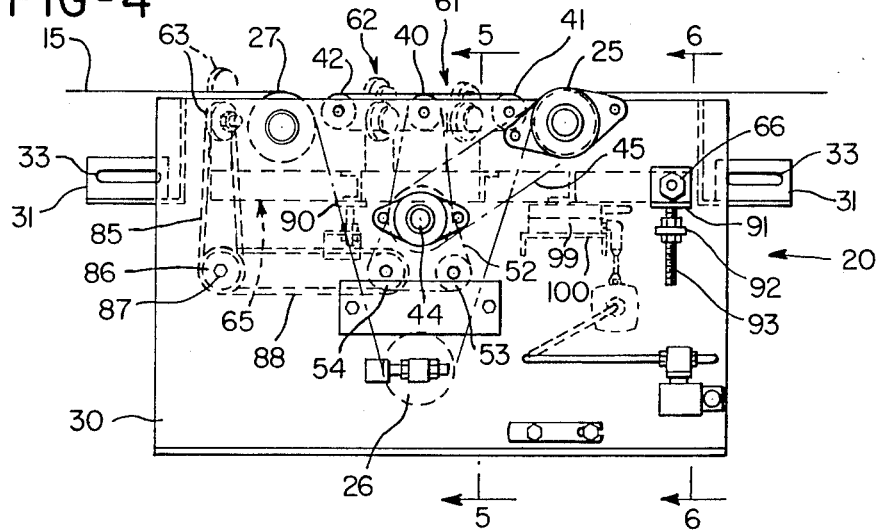
FIG. 4 is a side elevation taken as indicated by the line 4—4 of FIG. 3.
Figure 5:
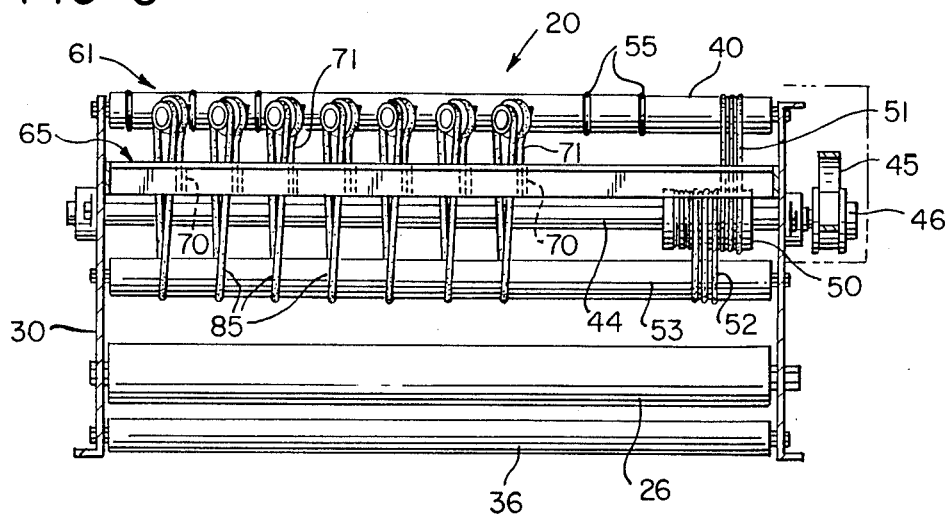
FIG. 5 is a section on the line 5—5 of FIG. 4.
Figure 6:
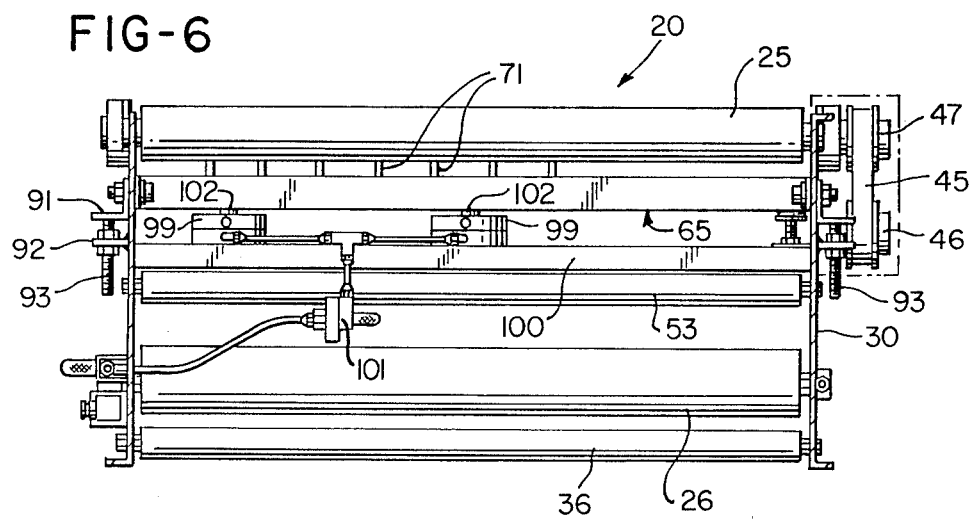
FIG. 6 is a section on the line 6—6 of FIG. 4.

The diverter wheel subframe 65 is normally supported in a Down position by a bumper 90 mounted for vertical adjustment on the inside of the frame 30. Preferably, all of the standards 71 are of the same height, and the subframe 65 is essentially horizontal in this Down position so that all of the wheels 60 will define a common horizontal plane located below the plane defined by the upper run of the belt 15 and the O-ring belts 55. Additional provision for adjustment to accomplish that result is provided by adjustable mountings for the pivot bearings 66. As shown in FIGS. 4 and 6, each of these bearings has secured thereto an angle bracket 91 mounted for vertical adjustment on a stud 92 threaded in a bracket 93 projecting from each side of the frame 30.

Provision is made for raising the subframe 65 to an Up position wherein all of the diverter wheels project above the conveying plane of the belt 15, the spacing of standards 71 and proportions of wheels 60 being such that the rows 61 and 62 of wheels can move freely through the spaces between roller 40 and rollers 41 and 42. As shown in FIGS. 4 and 6, two pneumatic cylinders 99 are mounted on a channel 100 extending across the interior of the frame 30 and are supplied with pressure air by a common solenoid-operated control valve 101. For preferred operating characteristics, each of these cylinders is of the type having its operating piston 102 projecting laterally from the cylinder and having a very short stroke, e.g. one quarter-inch.

Each of the pistons 102 engages the underside of the subframe 65, and the dimensions and positionings of the parts are such that when the cylinders 99 are fully operated, the subframe 65 will rise sufficiently to position all of the diverter wheels 60 above the plane of belt 15. Further, each of the rows 61–62 of diverter wheels and the single wheel at position 63 will rise different amounts, so that in the Up position of the subframe 65, the single diverter wheel 63 will be at the maximum height above the level of belt 15, and the row 62 of wheels will be at an intermediate height with respect to the wheel assembly 63 and the upstream row 61 of diverter wheels.

The sortation conveyor of the invention can be operated by a conventional control system of the computerized type wherein each carton is provided with indicia to be read by an appropriate scanner at the upstream end of the conveyor that designates to the computer the branch line to which that carton is to be delivered. Direct control of the valve 101 for each diverter assembly is effected by a photocell assembly 110 which includes a light beam source and is mounted on one side of the frame 30 just upstream from the first row 61 of diverter wheels in line with a target 111 on the opposite side of frame 30 which reflects the light beam from assembly 110.

The control circuit should therefore be such that when the computer has determined that a particular carton is to be delivered to the branch line 12, and has therefore completed a part of the energizing circuit for the associated control valve 101, the associated photocell 110 will complete that circuit and thus cause cylinders 99 to be actuated just as the leading end of the carton intercepts the beam from photocell assembly 110, and the cylinders 99 will be held in activated condition until the trailing end of that carton moves past the beam.

During this period of operation, if the leading end of the carton travels significantly beyond the second row 62 of diverter wheels and thereby into overhanging relation with the portion of the belt 15 traveling downstream from the gap, before it reaches the branch line, as is most likely to happen with relatively large cartons, there would be a possibility that even though the carton is raised above the belt 15 by the two rows 61 and 62 of diverter wheels, its leading end could tilt down and again make contact with the belt 15, with a resulting tendency to be pulled downstream beyond the branch line by the belt 15.

Such a result is effectively prevented by the single diverter wheel assembly 63, since not only is it at a higher level than the two rows of diverter wheels, but it is also in a position overlapping the run of belt 15 downstream from the gap in which the two rows of diverter wheels operate. Diverter wheel assembly 63 will therefore not only raise the leading end of the carton still higher, but since it is traveling at a higher linear speed than the other diverter wheels, it will have a tendency to force the carton to turn more toward the branch line while it is being carried onto the branch line by the two rows of diverter wheels.

It should also be noted that in view of the relatively short travel to be imparted to a carton by the diverter wheel assembly, provision should be made to align each successive package along the side of the belt 15 adjacent the branch lines 11–13, by conventional means located at the upstream end of the sortation conveyor.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A sortation conveyor system for cartons and other articles including a frame defining a main line and at least one branch line having the upstream end thereof leading from one side of said frame to receive articles diverted thereto from said main line, comprising:
   (a) power operated conveying means for conveying successive articles along said main line in a predetermined plane,
   (b) said conveying means having a transversely extending gap therein adjacent said upstream end of said branch line,
   (c) a diverter frame mounted for up and down movement on said main frame below said gap,
   (d) a plurality of diverter wheels mounted on said diverter frame for rotation on axes canted with respect to the length of said main line whereby said wheels define a course directed toward said branch line,
   (e) means establishing a lowered limit position for said diverter frame wherein said diverter wheels are below said conveying means plane and a raised limit position wherein said diverter wheels extend above said plane through said gap to engage and divert an article to said branch line from said main line,
   (f) said diverter frame including an arm extending downstream beyond said gap,
   (g) a further diverter wheel mounted on said arm downstream from said gap and adjacent but spaced laterally outwardly from said conveying means and positioned between said conveying means and the upstream end of said branch line,
   (h) said further diverter wheel being mounted for rotation on an axis substantially parallel with said axes of said plurality of diverter wheel and being movable with said diverter frame to said raised position, and
   (i) means for driving all of said diverter wheels whereby if an article engaged by said plurality of diverter wheels travels beyond said gap on said main line in partially laterally offset relation with said conveying means, said further diverter wheel will maintain the leading end of said article above said conveying means plane while supplementing the diverting action of the other said diverter wheels.

2. A conveyor system as defined in claim 1 wherein said driving means drives all of said diverter wheels at higher linear speeds than the linear speed of said conveying means.

3. A conveyor system as defined in claim 2 wherein said driving means drives said further diverter wheel at a higher linear speed than the other said diverter wheels.

4. A conveyor system as defined in claim 2 wherein said plurality of diverter wheels are arranged in two substantially parallel rows extending at substantially right angles to said main line, and further comprising means for driving said further diverter wheel at a higher linear speed than said plurality of diverter wheels.

5. A conveyor system as defined in claim 1 wherein said plurality of diverter wheels are arranged in two substantially parallel rows extending at substantially right angles to said main line, and further comprising means for driving the upstream said row of diverter wheels at a higher linear speed than said conveying means and for driving the other said row of diverter wheels and said further diverter wheel at progressively higher linear speeds.

6. A conveyor system as defined in claim 1 wherein said further diverter wheel is so mounted on said arm that in said raised position of said diverter frame, said further diverter wheel is spaced at a higher level above said conveying means plane than said plurality of said diverter wheels.

7. A conveyor system as defined in claim 1 wherein said plurality of diverter wheels are arranged in two substantially parallel rows extending at substantially right angles to said main line, and further comprising means effective in said raised position of said diverter frame to locate said further diverter wheel at a higher level above said conveying means plane than said plurality of diverter wheels.

8. A conveyor system as defined in claim 7 further comprising means effective in said Up position of diverter frame to locate the more downstream of said rows of diverter wheels at a higher level than the more upstream said row.

9. A conveyor system as defined in claim 6 wherein said driving means drives said plurality of diverter wheels at higher linear speeds than the linear speed of said conveying means, and drives said further diverter wheel at a still higher linear speed.

10. A conveyor system as defined in claim 8 further comprising means for driving said upstream row of diverter wheels at a higher linear speed than said conveying means and for driving the other said row of diverter wheels and said further diverter wheel at progressively higher linear speeds.

11. A conveyor system as defined in claim 1 wherein the tops of all of said diverter wheels define a common plane.

12. A conveyor system as defined in claim 1 wherein said conveyor means comprises a continuous belt traveling over a plurality of rollers including one roller mounted for rotation in said frame in closely downstreamed relation with said gap, and wherein said further diverter wheel is located on the downstream side of said roller from said gap and between said belt and the upstream end of said branch line.

* * * * *